3,426,000
POLYCARBONAMIDES FROM DURENE DIACETIC ACID
James S. Ridgway, Durham, N.C., assignor to Monsanto Company, St. Louis, Mo., a corporation of Delaware
No Drawing. Filed Nov. 17, 1966, Ser. No. 595,011
U.S. Cl. 260—78                4 Claims
Int. Cl. C08g 29/20, 41/02

ABSTRACT OF THE DISCLOSURE

This invention is directed to novel copolyamides having increased boiling water shrinkage produced from hexamethylene diamine, adipic acid and durene diacetic acid. These copolyamides are useful in the production of fibers, having a high boiling water shrinkage.

---

Polyamides, such as polyhexamethylene adipamide (nylon 66) and polycaproamide (nylon 6) are well known in the art and have found significant commercial success both as textile fibers and as reinforcing fibers, such as tire cord. Although the textile fibers obtained from the previously known fiber-forming polyamides heretofore known are of great value, much research effort is being continuously expended in order to improve their properties. For example, these previously known polyamides all possess a relatively low shrinkage value, that is, the amount of shrinkage that occurs in fibers made from these polyamides when they are treated with boiling water is relatively small. In some commercial uses, for example, as hosiery, it is desirable that the polyamide textile fibers have increased shrinkage. Furthermore, in the production of conjugate fibers, that is, a fiber having two or more components, it is extremely desirable that at least one of the components have a relatively high boiling water shrinkage. This is necessary in order that the crimp in a conjugate fiber be significant and permanent.

It is an object of this invention to provide a novel copolyamide.

It is a further object of this invention to provide a novel synthetic linear fiber-forming copolyamide which has increased boiling water shrinkage characteristics.

It is a further object of this invention to provide a novel synthetic linear copolyamide from a durene diacetic acid.

It is a still further object of this invention to provide a textile fiber composed of this novel synthetic linear fiber-forming copolyamide.

These and other objects will become apparent from the description given hereinafter.

The copolyamides of the present invention are useful in the production of shaped articles by extrusion, molding or casting in the nature of yarns, fabrics, films, pellicles, bearings, ornaments or the like. They are particularly useful in the production of textile fibers and as reinforcing cords produced therefrom.

The present invention provides a novel linear fiber-forming copolyamide composed of A 50 to 99 mole percent, based on the molecular weight of the copolyamide, of units represented by the structure

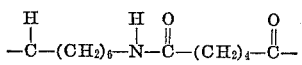

B 1 to 50 mole percent, based on the molecular weight of the copolyamide, of units represented by the structure

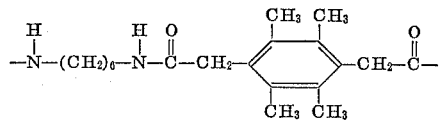

In a typical preparation the copolyamide is formed by interpolymerizing A substantially equimolecular proportions of adipic acid and hexamethylene diamine, B substantially equimolecular proportions of a durene diacetic acid and hexamethylene diamine, wherein component A is present in an amount sufficient to provide 50 to 99, preferably 70 to 90 mole percent of the final copolymer and component B is present in an amount sufficient to provide 1 to 50, preferably 10 to 30 mole percent of the final copolymer. It will be understood that the designation "equimolecular proportions" of the diamines and the diacids includes the preformed salt reaction products thereof. It is, of course, obvious that the total mole percentage will not exceed 100 mole percent.

The copolyamides of this invention are prepared by procedures well known in the art and commonly employed in the manufacture of simple polyamides. That is, the reactants are heated at a temperature of from 180° C. to 300° C. and preferably from 200° C. to 295° C. until the product has a sufficiently high molecular weight to exhibit fiber-forming properties, which properties are reached when the copolyamide has an intrinsic viscosity of at least 0.4. The reaction can be conducted at superatmospheric, atmospheric or subatmospheric pressure. Often it is desirable, especially in the last stage of the reaction, to employ conditions, e.g., reduced pressure, which will aid in the removal of the reaction by-products. Preferably the reaction is carried out in the absence of oxygen, for example, in an atmosphere of nitrogen.

Intrinsic viscosity as employed herein is defined as $$C \xrightarrow{\text{Lim}} 0 \left(\frac{\log_e N_r}{C}\right)$$

in which $N_r$ is the relative viscosity of a dilute solution of the polymer in m-cresol in the same units at the same temperature and C is the concentration of grams of polymer per 100 cc. of solution.

The amount of component A present in the copolymers of the present invention ranges from 50 to 99, preferably 90 to 70 mole percent based on the molecular weight of the copolymer. Copolyamides in which component A is present in amounts less than about 50 mole percent are usually to be avoided since the tenacity of filaments produced therefrom is drastically reduced. Component B is present in the copolymer in an amount of from 1 to 99, preferably 10 to 50 mole percent based on the weight of the copolymer. It has been found that the copolymer compositions thus prepared have a substantially increased boiling water shrinkage. Furthermore, the copolyamide filaments of the present invention are transparent. This is surprising since most known polyamides, including polyhexamethylene adipamide, are not transparent. Of course, in many applications, such as sewing threads, the advantages of transparent filaments is obvious.

In order to illustrate the invention and the advantages thereof with greater particularity, the following specific examples are given. It is to be understood that they are intended to be only illustrative and not limitative. Parts are given by weight unless otherwise indicated.

EXAMPLE I

A solution containing 120.7 parts (90 mole percent) of hexamethylenediammonium adipate and 18.8 parts (10 mole percent) of the hexamethylene diamine salt of durene diacetic acid, dissolved in 80 parts of water, was placed in a stainless-steel, high pressure autoclave which had been previously purged with purified nitrogen. The temperature and pressure within the autoclave were slowly raised until values of 220° C. and 250 p.s.i.g., respectively, were reached. The temperature was then further increased to 243° C. while the pressure was maintained at 250 p.s.i.g., by removal of steam as condensate.

When this point was reached, the pressure within the autoclave was gradually reduced to atmospheric over a 25-minute period. During this period the temperature was allowed to level out at 280° C. at which point the polymer melt was allowed to equilibrate for 30 minutes.

The resultant polymer, thus obtained, was nearly transparent and had a melting point of approximately 254° C. This molten polymer was melt spun directly from the bottom of the autoclave through a single-hole spinneret to yield a mono-filament yarn having good textile properties.

EXAMPLE II

A solution of 92.8 parts (80 mole percent) of hexamethylene diammonium adipate and 32.4 parts (20 mole percent) of the hexamethylene diamine salt of durene diacetic acid, dissolved in 80 parts of water, was added to a stainless-steel autoclave. Polymerization of this mixture was brought about by the steps and procedures as set forth in Example I. The resulting, transparent polymer melting point was measured to be approximately 252° C.

This finished polymer was melt spun directly from the autoclave through a single-hole spinneret to yield a mono-filament yarn having good textile properties.

Comparative tests were conducted to determine relative boiling water shrinkage in comparison to a conventional polyhexamethylene adipamide (nylon 66) yarn. The yarns were exposed to boiling water for a period of 5 minutes and their lengths were measured both before and after exposure. The percent boiling water shrinkage is determined by the following formula:

$$\frac{\text{length before exposure} - \text{length after exposure}}{\text{length before exposure}} \times 100 =$$

percent boiling water shrinkage

The results obtained in this test are illustrated by the following table:

| Example: | Boiling water shrinkage, percent |
|---|---|
| I | 15 |
| II | 19 |
| Nylon 66 (control) | 10 |

As can be seen from the above table, the yarns prepared from the copolyamides obtained in accordance with the present invention exhibit a significant increase in boiling water shrinkage when compared to a yarn prepared from a conventional polyamide.

As many widely different embodiments of this invention may be made without departing from the spirit and scope thereof, it is to be understood that the invention is not to be limited by the specific embodiments set forth herein but only by the claims which follow.

I claim:
1. A linear fiber-forming copolyamide consisting of (A) 50 to 99 mole percent based on the molecular weight of the copolyamide of units represented by the structure

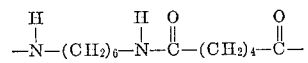

and (B) 1 to 50 mole percent based on the molecular weight of the copolyamide of units represented by the structure

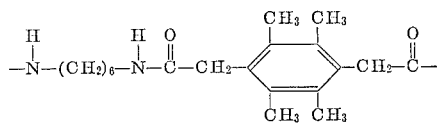

2. The linear, fiber-forming copolyamide of claim 1 wherein (A) provides 70 to 90 mole percent and (B) provides 10 to 30 mole percent of the copolyamide.
3. A textile fiber consisting of the copolyamide as defined in claim 1.
4. A textile fiber consisting of the copolyamide as defined in claim 2.

References Cited
UNITED STATES PATENTS

| 2,163,584 | 6/1939 | Carothers | 260—78 |
| 2,916,475 | 12/1959 | Caldwell et al. | 260—78 |
| 2,965,616 | 12/1960 | Caldwell et al. | 260—78 |
| 3,012,994 | 12/1961 | Bell et al. | 260—78 |
| 3,046,257 | 7/1962 | Evans et al. | 260—78 |
| 3,126,362 | 3/1964 | Bussink | 260—78 |
| 3,197,444 | 7/1965 | Moody | 260—78 |
| 3,335,114 | 8/1967 | Huffman et al. | 260—78 |

WILLIAM H. SHORT, *Primary Examiner.*

H. D. ANDERSON, *Assistant Examiner.*

U.S. Cl. X.R.

264—176; 152—330